United States Patent
Planas et al.

(10) Patent No.: US 9,764,702 B2
(45) Date of Patent: Sep. 19, 2017

(54) SYSTEM AND METHOD FOR MANAGING THE ELECTRICAL POWERING OF AT LEAST ONE PIECE OF EQUIPMENT DURING THE AUTOMATIC RESTARTING OF AN INTERNAL COMBUSTION ENGINE OF A VEHICLE

(71) Applicant: RENAULT s.a.s., Boulogne-Billancourt (FR)

(72) Inventors: Thierry Planas, Maurepas (FR); Sebastien Gehin, Le Mesnil Saint Denis (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 300 days.

(21) Appl. No.: 14/428,086

(22) PCT Filed: Jul. 31, 2013

(86) PCT No.: PCT/FR2013/051849
§ 371 (c)(1),
(2) Date: Mar. 13, 2015

(87) PCT Pub. No.: WO2014/041266
PCT Pub. Date: Mar. 20, 2014

(65) Prior Publication Data
US 2015/0258948 A1  Sep. 17, 2015

(30) Foreign Application Priority Data

Sep. 13, 2012  (FR) ..................................... 12 58617

(51) Int. Cl.
*H02G 3/00* (2006.01)
*B60R 16/033* (2006.01)
(Continued)

(52) U.S. Cl.
CPC ........ *B60R 16/033* (2013.01); *B60L 11/1862* (2013.01); *F02N 11/0814* (2013.01);
(Continued)

(58) Field of Classification Search
CPC ............. F02N 11/0814; F02N 11/0818; B60L 11/1862; B60R 16/033
(Continued)

(56) References Cited

U.S. PATENT DOCUMENTS

| 2001/0019224 A1* | 9/2001 | Amano | ................... B60L 11/14 307/10.7 |
| 2007/0170778 A1* | 7/2007 | Yamaguchi | .............. B60K 1/00 307/10.1 |
| 2007/0188964 A1* | 8/2007 | Yamaguchi | ............... H02J 1/14 361/139 |

OTHER PUBLICATIONS

International Search Report Issued Oct. 1, 2013 in PCT/FR13/051849 Filed Jul. 31, 2013.
(Continued)

*Primary Examiner* — Thomas Skibinski
(74) *Attorney, Agent, or Firm* — Oblon, McClelland, Maier & Neustadt, L.L.P.

(57) ABSTRACT

A system and method for management of electrical powering of at least one piece of electrical equipment by a power supply battery of a motor vehicle including an internal combustion engine. The motor vehicle includes a system for automatically stopping and restarting the internal combustion engine. The system and method: determine a charge status of the power supply battery; compare the charge status of the power supply battery with a predefined threshold value; and control cutting off of the power supply to the at least one piece of electrical equipment during an automatic restarting of the internal combustion engine if the charge status of the power supply battery is lower than the predefined threshold value.

10 Claims, 4 Drawing Sheets

Figure 1:
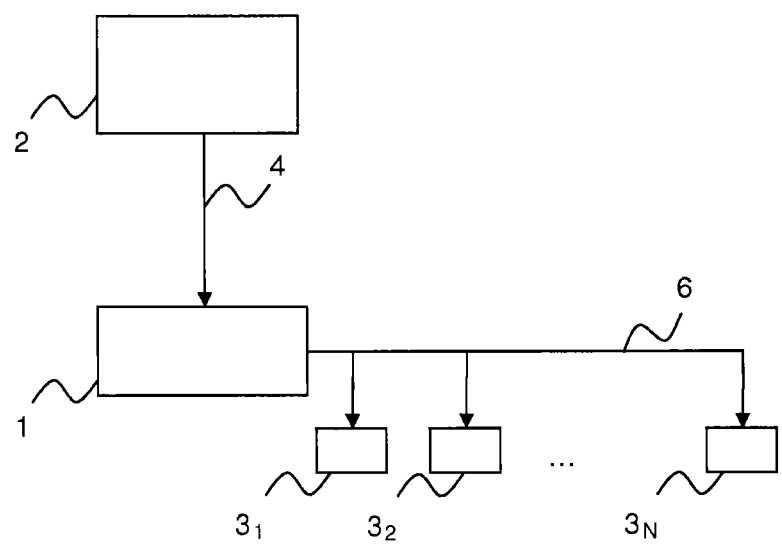

(51) Int. Cl.
  *F02N 11/08*    (2006.01)
  *B60L 11/18*    (2006.01)
  *H02J 1/14*     (2006.01)
  *H02J 7/00*     (2006.01)

(52) U.S. Cl.
  CPC ............ *F02N 11/0818* (2013.01); *H02J 1/14* (2013.01); *F02N 2200/061* (2013.01); *H02J 7/0021* (2013.01); *Y02T 10/48* (2013.01); *Y02T 10/7055* (2013.01)

(58) Field of Classification Search
  USPC .......... 307/10.6, 10.7, 10.1, 9.1; 123/179.4; 320/104, 103, 109; 701/112; 290/38 E
  See application file for complete search history.

(56) References Cited

OTHER PUBLICATIONS

French Search Report Issued May 2, 2013 in Application No. FR 1258617 Filed Sep. 13, 2012.

\* cited by examiner

SYSTEM AND METHOD FOR MANAGING THE ELECTRICAL POWERING OF AT LEAST ONE PIECE OF EQUIPMENT DURING THE AUTOMATIC RESTARTING OF AN INTERNAL COMBUSTION ENGINE OF A VEHICLE

The present invention relates to combustion-engine motor vehicles equipped with a system for automatically stopping and restarting the engine.

Systems for automatically stopping and restarting the combustion engine are a solution in the motor vehicle domain to reduce carbon dioxide emissions in compliance with increasingly tighter regulations. These systems command the automatic stopping of the engine when the vehicle is stationary or almost stationary, for example in dense traffic conditions or at an intersection requiring the vehicle to stop (red traffic light, stop sign, etc.). The automatic restarting of the vehicle is, for its part, triggered as soon as the vehicle must move again, typically when the brake pedal is released or when the accelerator or clutch pedal is engaged.

Each automatic restarting requires a significant quantity of energy and it is therefore crucial to ensure that the power supply battery of the vehicle is sufficiently charged in order to enable the restarting.

A known solution, for example from the document WO2011/026821, is to authorize the automatic stopping of the engine only if the state of charge, or SOC, of the vehicle battery is sufficient to effectively allow restarting later.

Furthermore, motor vehicles are increasingly being provided with various items of electrical equipment. Some of the electrical equipment is referred to as "safety" equipment (lighting and indicating systems, horns, assisted driving, ABS braking, etc.) and absolutely must not be cut off when the vehicle is used, even when stationary, while other electrical equipment is referred to as "comfort" equipment (air conditioning/heating, radio, power seats, power windows, etc.).

In some automatic stopping and restarting systems, drawing a distinction between electrical equipment that is not important for safety and electrical equipment that is important for safety is known. More specifically, systems exist which do not authorize the automatic stopping phase of the combustion engine if the state of charge of the battery is not sufficient to simultaneously ensure that the safety features are supported and the engine is restarted. When a stopping phase of the combustion engine is authorized, the electrical power supply of the safety equipment is maintained, but all or some of the electrical comfort equipment is on the other hand routinely cut off in order that the restarting is not compromised.

As illustrated in FIG. 1, a known electrical equipment power supply management system for a motor vehicle conventionally includes a module 1 for managing the electrical power supplies of the vehicle, and is connected, on the one hand, to the system for automatically stopping and restarting the combustion engine (not represented), for example to a module 2 for managing the restarting of the combustion engine when the required conditions are met, and, on the other hand, to a plurality of items of electrical equipment $3_1, 3_2, \ldots, 3_N$ referred to as comfort equipment. The connections used between the various modules and the equipment are conventional wire links 4 or local network links (CAN, LIN, MOST, etc.) and electrical power supply links 6.

Figure 2:
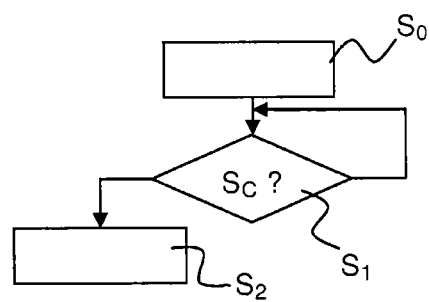

The steps for operating such a system are represented in FIG. 2. To start with, it is assumed that the automatic stopping and restarting system has already authorized an automatic stopping of the combustion engine, so that the vehicle is in a state corresponding to the stopped engine, as represented by the initial step $S_0$. The various items of electrical equipment are nevertheless still powered via the vehicle battery. At the moment when the automatic stopping and restarting system must trigger the restarting, the module 2 sends an instruction signal $S_C$ indicating that a restarting of the combustion engine is required. The module 1 is constantly testing (step $S_1$) whether it is receiving the instruction signal. If necessary, it applies the instruction by sending a cutoff signal to the various items of electrical comfort equipment $3_1, 3_2, \ldots, 3_N$ and/or to the electronic computers which drive these items of equipment (step $S_2$).

The routine cutting-off of all or some of the comfort equipment poses problems with regard to the driver and/or the passengers in the vehicle, in particular in driving situations for which the stopping and restarting cycles are very frequent. The vehicle occupants are thus eventually tempted to deactivate the automatic stopping and restarting feature in order to not endure the inconveniences associated with these repeated cutoffs.

The document US2007/0188964 discloses a device for limiting power supplies to electrical components of a vehicle when it has been assessed that a condition has been satisfied according to which this vehicle is in an economy running state. However, a power supply limitation which can be extended over a more or less long duration while the vehicle is in the economy running state exhibits another drawback which is that of requiring a solution to the problem of not producing an inconvenience for the user, associated with the limitation duration.

The present invention aims to overcome the drawbacks of the prior art.

To this end, a subject of the invention is a method for managing the electrical power supply of at least one item of electrical equipment by an electrical power supply battery of a combustion-engine motor vehicle, said motor vehicle including a system for automatically stopping and restarting the combustion engine, the method being characterized in that it includes the steps of:
  determining the state of charge of the electrical power supply battery;
  comparing the state of charge of the power supply battery with a predefined threshold value;
  cutting off the electrical power supply of said at least one item of electrical equipment during the automatic restarting of the combustion engine if the state of charge of the electrical power supply battery is less than the predefined threshold value.

According to other possible features:
  the comparison step is preceded by a step for detecting the reception of an instruction signal indicating that a restarting of the combustion engine is required, sent for example by an automatic restarting management module of the system for automatically stopping and restarting the combustion engine;
  as a variant, the comparison step precedes an order for restarting the combustion engine;
  the cutoff step is followed by a step for validating a restarting order.

Another subject of the invention is a system for managing the electrical power supply of at least one item of electrical equipment by an electrical power supply battery of a combustion-engine motor vehicle, said motor vehicle including a system for automatically stopping and restarting the combustion engine, the management system being characterized in that it includes an electrical load-shedding supervision module able to compare the state of charge of the power supply battery with a predefined threshold value and able to command the cutting-off of the electrical power supply for said at least one item of electrical equipment during the automatic restarting of the combustion engine if the state of charge of the electrical power supply battery is less than the predefined threshold value.

The electrical load-shedding supervision module may be able to determine said state of charge of the power supply battery from environmental parameters and from measurements of a battery voltage and current.

The system can comprise one or more links to directly connect said supervision module to said at least one item of electrical equipment so as to cut off its electrical power supply.

The supervision module can be connected by a link so as to shed, via an inter-system load-shedding request indication, said at least one item of electrical equipment.

The system can comprise a module connected to the supervision module by a link so as to shed, via an inter-system load-shedding request indication, the electrical power supplies of said at least one item of electrical equipment.

Figure 3:
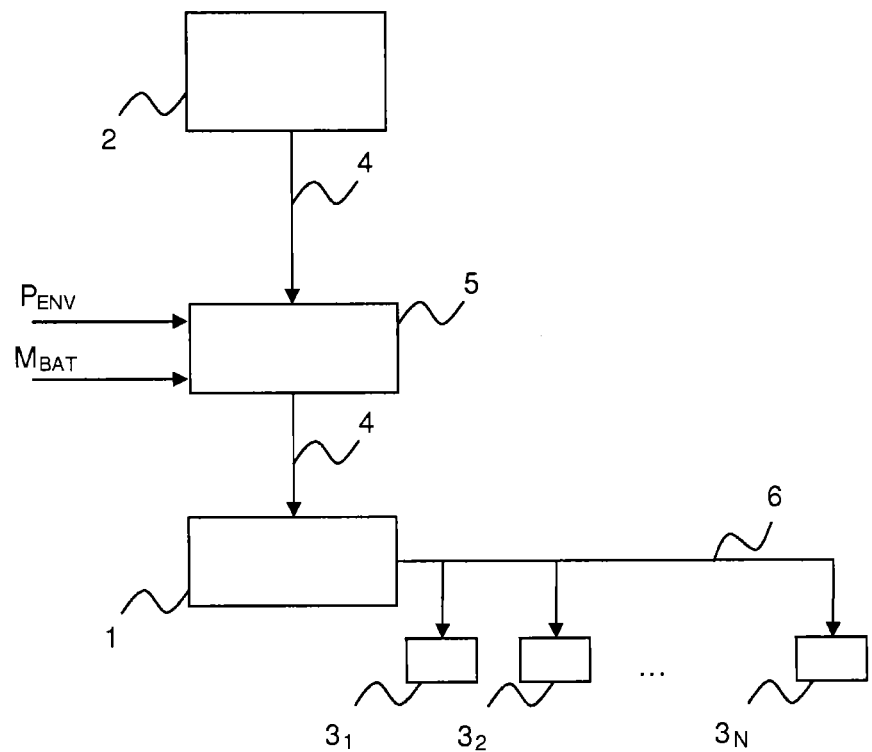
Figure 4:
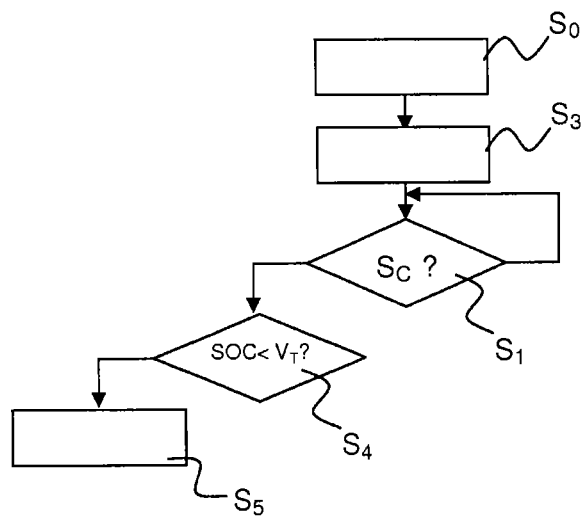
Figure 5:
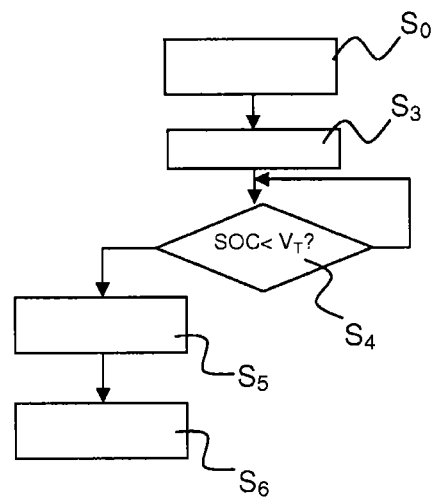
Figure 6:
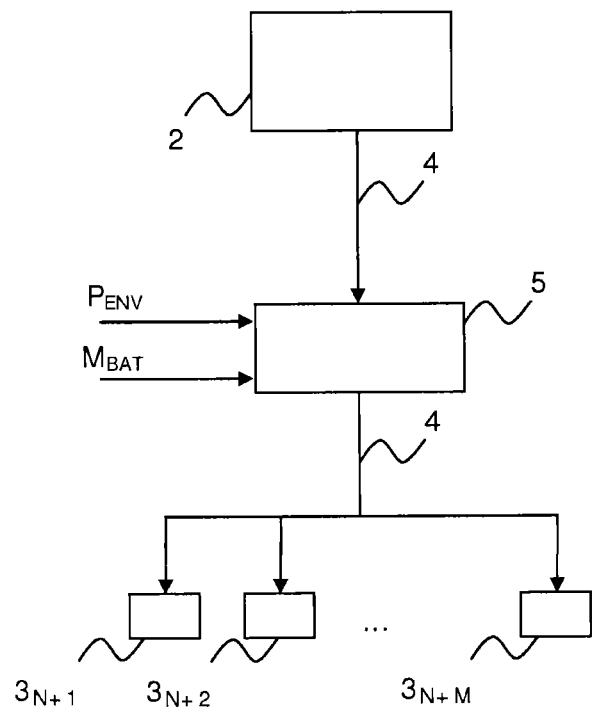
Figure 7:
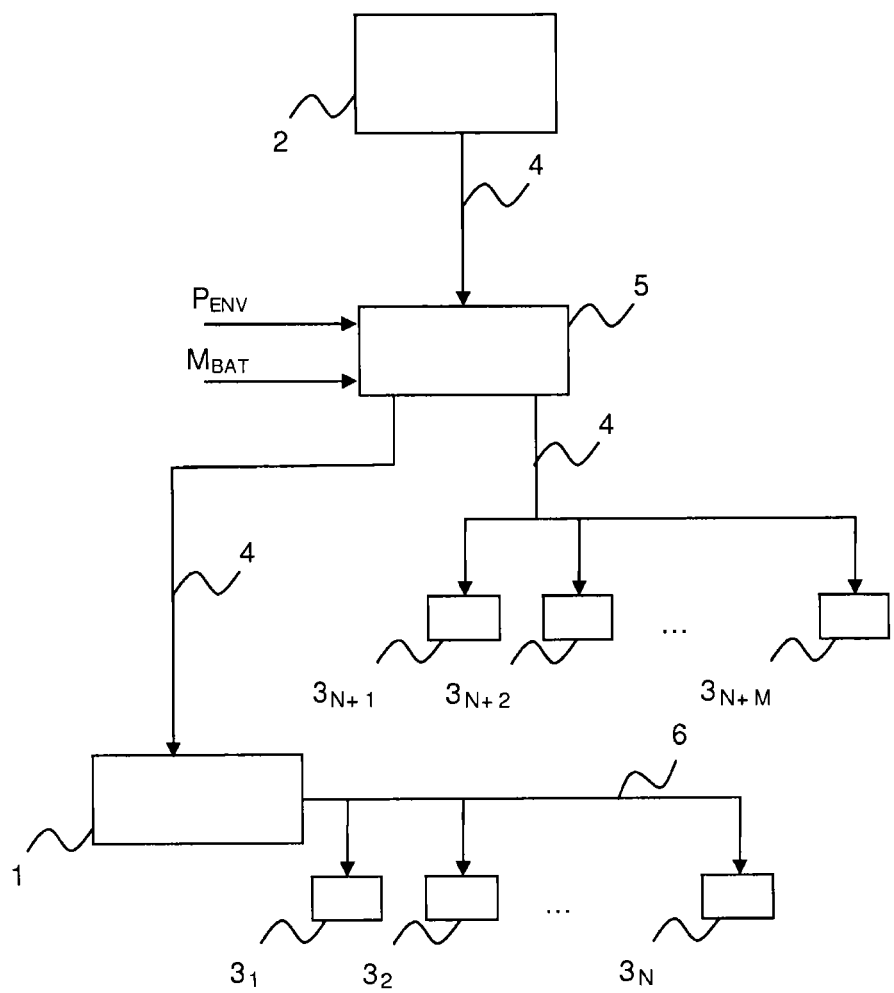

The invention and the various advantages which it provides will be better understood in view of the following description, given with reference to the appended figures, in which:

FIG. 1, already described, schematically illustrates a known system for managing the power supply of electrical equipment during a restarting of the combustion engine of a motor vehicle;

FIG. 2, already described, represents the steps of the management method generally implemented with the system of FIG. 1;

FIG. 3 schematically illustrates a system for managing the power supply of electrical equipment during a restarting in accordance with a first embodiment of the invention;

FIG. 4 describes the steps that can be implemented by the system of FIG. 3, according to a first management method in accordance with the invention;

FIG. 5 describes the steps that can be implemented by the system of FIG. 3, according to a second management method in accordance with the invention;

FIG. 6 schematically illustrates a system for managing the power supply of electrical equipment during a restarting in accordance with a second embodiment of the invention;

FIG. 7 is a variant of the management system of FIG. 6.

In the whole of the description, items common to the various figures bear the same references.

In FIG. 3, there is presented a configuration of a system equipping a motor vehicle, similar to that already described with reference to FIG. 1, with a system 1 for managing the electrical power supply of a plurality of items of comfort equipment $3_1$, $3_2$, . . . , $3_N$ via the vehicle battery (not represented) and a module 2 managing the restarting of the combustion engine (not represented) of the vehicle. Unlike in FIG. 1 however, the management system according to the invention includes here a load-shedding supervision module 5 connected, on the one hand, to the automatic restarting module. 2, and, on the other hand, to the system 1 for managing the electrical power supply of the equipment $3_1$, $3_2$, . . . , $3_N$. The connections used between the various modules and the equipment are conventional wire links 4 or local network links (CAN, LIN, MOST, etc.) and electrical power supply links 6.

The load-shedding supervision module 5 is able to assess, from environmental parameters $P_{ENV}$ such as temperature and ageing and from voltage and current measurements $M_{BAT}$ carried out on the battery, the state of charge SOC of the battery. As a variant, the module 5 could receive a determination of the state of charge SOC by another item of equipment, for example a battery management module. In all cases, the load-shedding supervision module 5 will use this state of charge to decide whether it is appropriate to cut off the electrical power supply to one or more of said items of comfort equipment $3_1$, $3_2$, . . . , $3_N$ when an automatic stopping of the combustion engine has been performed, and whether it is appropriate to restart this engine.

An example of operation of the system according to the invention is explained with reference to FIG. 4. In this figure, there is presented the initial step $S_0$ corresponding to the vehicle in the "stopped engine" situation, all the electrical comfort equipment $3_1$, $3_2$, . . . , $3_N$ nevertheless still being powered by the vehicle battery. During step $S_3$, the load-shedding supervision module 5 determines the state of charge SOC of the battery from environmental parameters $P_{ENV}$ and from battery measurements $M_{BAT}$ which it receives. The module 5 additionally verifies, at step $S_1$, whether it receives from the automatic restarting management module 2 an instruction signal $S_C$ indicating that a restarting of the combustion engine is required. From the moment this instruction signal $S_C$ is received, the module 5 then compares the state of charge SOC determined at step $S_3$ with a predefined threshold value $V_T$ (step $S_4$). The threshold value $V_T$ is adjusted beforehand, for example at the factory, according to the electrical comfort equipment equipping the motor vehicle, or according to a subset of such comfort equipment, in such a way as to indicate the minimum state of charge that the battery must have in order to provide for an automatic restarting while leaving the electrical comfort equipment powered. Thus, in use, the cutting-off of the electrical power supply to the comfort equipment (or to the electronic computers driving this electrical equipment) is commanded by the load-shedding supervision module 5 only if the state of charge SOC is less than the threshold value $V_T$ (step $S_5$). In the other cases, the restarting is performed while keeping the comfort equipment powered.

In some cases, depending on the motor vehicles, the automatic restarting management module 2, the load-shedding supervision module 5 and the electrical management system 1 can be quite far apart from one another. The result of this is that the data exchange times via the links 4 can be quite significant, with the risk that the cutoff order is not received early enough. FIG. 5 illustrates another way of using the management system according to the invention, enabling this problem to be overcome. In this case, the load-shedding supervision module 5 does not wait to receive an instruction signal indicating that a restarting order is required. In a different way, it determines the state of charge (step $S_3$) and compares this state of charge (step $S_4$) with the threshold value $V_T$, then orders the cutoff of at least one item of electrical equipment (step $S_5$ if the state of charge is less than the threshold value $V_T$. The supervision module 5 then sends to the automatic restarting management module 2 a validation signal indicating that a restarting can be performed (step $S_6$). By thus anticipating the restarting instruction, it is ensured that all the conditions are met for enabling an automatic restarting of the engine, even if the state of charge of the battery is not high enough to also allow the comfort equipment to be supported.

In the case of the architecture of FIG. 3, the cutoff orders are sent by the load-shedding supervision module 5 to the electrical power supply management system 1. Other architectures can nevertheless be envisaged, without departing from the scope of the present invention. Thus, as illustrated in FIG. 6, the load-shedding supervision module 5 is directly connected to the various items of electrical comfort equipment $3_{N+1}, 3_{N+2}, \ldots, 3_{N+M}$. FIG. 7 illustrates, for its part, another variant in which the load-shedding supervision module 5 is connected:

on the one hand, to N items of electrical comfort equipment $3_1, 3_2, \ldots, 3_N$ via an electrical power supply management system 1 for this equipment, and on the other hand, directly to M other items of electrical comfort equipment $3_{N+1}$ to $3_{N+M}$.

It is moreover noted that, in the invention, it is not necessary to be concerned with knowing whether or not the items of electrical comfort equipment have been activated by the vehicle occupants before an automatic restarting order.

The invention claimed is:

1. A system for managing an electrical power supply of at least one item of electrical equipment by an electrical power supply battery of a combustion-engine motor vehicle, the motor vehicle including a system for automatically stopping and restarting the combustion engine, the management system comprising:

an electrical load-shedding supervision module configured to compare a state of charge of the power supply battery with a predefined threshold value and to command, during an automatic stopping condition of the motor vehicle whereby the combustion engine has been automatically stopped, cutting-off of the electrical power supply for the at least one item of electrical equipment immediately prior to and during an automatic restarting of the combustion engine responsive to the comparing the state of charge of the power supply battery with the predetermined threshold value indicating that the state of charge of the electrical power supply battery is less than the predefined threshold value.

2. The management system as claimed in claim 1, wherein the electrical load-shedding supervision module is configured to determine the state of charge of the power supply battery from environmental parameters and from measurements of a battery voltage and current.

3. The management system as claimed in claim 1, further comprising one or more links to directly connect the electrical load-shedding supervision module to the at least one item of electrical equipment to cut off its electrical power supply.

4. The management system as claimed in claim 3, wherein the electrical load-shedding supervision module is connected by a link to load-shed, via an inter-system load-shedding request indication, the at least, one item of electrical equipment.

5. The management system as claimed in claim 1, further comprising a module connected to the electrical load-shedding supervision module by a link to load-shed, via an inter-system load-shedding request indication, the electrical power supplies of the at least one item of electrical equipment.

6. A method for managing an electrical power supply of at least one item of electrical equipment by an electrical power supply battery of a combustion-engine motor vehicle, the motor vehicle including a system for automatically stopping and restarting the combustion engine, the method comprising:

determining a state of charge of the electrical power supply battery;

during an automatic stopping condition of the motor vehicle whereby the combustion engine has been automatically stopped, comparing the state of charge of the power supply battery with a predefined threshold value; and cutting off the electrical power supply of the at least one item of electrical equipment immediately prior to and during an automatic restarting of the combustion engine responsive to said comparing indicating that the state of charge of the electrical power supply battery is less than the predefined threshold value.

7. The method as claimed in claim 6, wherein said comparing is preceded by detecting reception of an instruction signal indicating that a restarting of the combustion engine is required.

8. The method as claimed in claim 7, wherein the instruction signal is sent by an automatic restarting management module of the system for automatically stopping and restarting the combustion engine.

9. The method as claimed in claim 6, wherein said comparing precedes an order for restarting the combustion engine.

10. The method as claimed in claim 9, wherein said cutting off is followed by validating a restarting order.

* * * * *